(12) United States Patent
Diaz Arias et al.

(10) Patent No.: US 11,358,741 B2
(45) Date of Patent: Jun. 14, 2022

(54) ULTRA-HIGH-FREQUENCY ELECTROMAGNETIC MOTOR

(71) Applicants: Herman Diaz Arias, Atizapán de Zaragoza (MX); Ma Isabel de Jesús Pier Romero, Atizapán de Zaragoza (MX)

(72) Inventors: Herman Diaz Arias, Atizapán de Zaragoza (MX); Ma Isabel de Jesús Pier Romero, Atizapán de Zaragoza (MX)

( * ) Notice: Subject to any disclaimer, the term of this patent is extended or adjusted under 35 U.S.C. 154(b) by 338 days.

(21) Appl. No.: 16/337,434

(22) PCT Filed: Sep. 25, 2017

(86) PCT No.: PCT/MX2017/000105
§ 371 (c)(1),
(2) Date: Mar. 28, 2019

(87) PCT Pub. No.: WO2018/062983
PCT Pub. Date: Apr. 5, 2018

(65) Prior Publication Data
US 2020/0039666 A1    Feb. 6, 2020

(30) Foreign Application Priority Data
Sep. 30, 2016    (MX) .................... MX/a/2016/012856

(51) Int. Cl.
*B64G 1/40*    (2006.01)
*F03H 99/00*   (2009.01)
*H02N 11/00*   (2006.01)
*H02N 15/04*   (2006.01)

(52) U.S. Cl.
CPC ............. *B64G 1/409* (2013.01); *F03H 99/00* (2013.01); *H02N 11/00* (2013.01); *H02N 15/04* (2013.01)

(58) Field of Classification Search
CPC .......... B64G 1/409; B64G 1/40; H02N 15/04; H02N 11/00; F03H 99/00; F03H 3/00
See application file for complete search history.

(56) References Cited

U.S. PATENT DOCUMENTS

| | | | | |
|---|---|---|---|---|
| 4,663,932 A | * | 5/1987 | Cox ........................ | F03H 99/00 313/359.1 |
| 10,135,323 B2 | * | 11/2018 | Purvis ..................... | F03H 99/00 |
| 2005/0109879 A1 | * | 5/2005 | Patterson ................. | G21K 1/00 244/53 R |
| 2011/0302906 A1 | * | 12/2011 | Sinko .................... | B64G 1/409 60/204 |

* cited by examiner

*Primary Examiner* — Michael C Zarroli

(57) ABSTRACT

The operation of the ultra-high frequency (UHF) electromagnetic motor or thruster, is based on generating extremely short and powerful electrical, magnetic or electromagnetic field pulses and separating (unrooting) or disassociating said field pulses from the originating source, so that subsequently the emitting device and a device that is the objective or target, a support structure that supports both devices and another elements connected to said support structure are for an instant disassociated from the field, waiting for the pulsed field to reach the objective or target. At that moment, the element emits a field with a polarization that allows the exertion of a force that attracts or repels the field pulse, with respect to the objective or target and consequently with respect to the motor of which they form part as a unit, both the emitter and the target being joined by a support structure.

11 Claims, 13 Drawing Sheets

ULTRA-HIGH-FREQUENCY ELECTROMAGNETIC MOTOR

FIELD OF INVENTION

This invention is developed in the fields of electronic engineering and physics, particularly in electromagnetic theory.

BACKGROUND OF THE INVENTION

The concept of the present invention consists of a motor or thruster that for its operation only requires electric power supply and that it can be used in outer space to extend the useful life of communications satellites and to be employed in space vehicles; currently there is no motor or thruster that can be powered only with electric energy from solar cells or atomic batteries, and that can work in outer space, the closest thing to an electric power based propulsion system, are ion motors or thrusters; these motors however require a material, usually a gas, which is ionized and the resulting ions accelerated by an electric field, and although the mass of the ions is extremely small, this is compensated by very large ejection speeds, giving this type of motor a greater efficiency than chemical ones, these motors continue to operate on the basis of Newton's third law, they expel a certain amount of material with a certain speed and the product of that mass by the output speed, which constitutes a quantity of movement or momentum, causes a motor acceleration that is proportional to this one and in opposite direction, this is only another kind of reaction motor in which the ejected material is accelerated by electrical and non-chemical means as happens in conventional chemical motors or thrusters, however the problem is that when the gas supply is finished, the motor stops working.

Other designs of electric propulsion systems such as magnetohydrodynamic propulsion motors have been made, these motors only work in the sea because they are based on the generation of magnetic fields in the salt water surrounding the engine or the boats or submarines that have been designed with this technology, however, it is clear that this type of systems cannot operate out of water.

The sail propulsion for use in outer space, tends to take advantage of the energy from the sun or laser beams located on the surface of the earth or in orbit but have many problems to address the ships in the desired direction and the dimensions of the sails are gigantic, this propulsion is based on a process of kinetic transference.

The true contribution of our design is that it doesn't require any gaseous propellant nor is it based on effects of kinetic transfer or action and reaction. There are many motors designs that work exclusively on electric power, but none of them can operate in vacuum or outer space as propulsion elements.

SUMMARY OF THE INVENTION

The motor or thruster object of this invention, has several modes of operation, in its first modality, consists of a structure to which is fixed a magnetic field emitter such as an arrangement of Helmholtz coils and a target consisting of a conducting material plate, located at a preset distance (L) the generating coil produces a very high intensity magnetic field pulse but only for an extremely small time (t), so small that it should be less than the distance (L) (distance between field emitter and target) divided by the speed of light so a very high intensity magnetic field, will have been produced and this field will travel in the surrounding space to the motor but after time (t) this field will be will be unlinked from the element that generated it and therefore this field will be associated with the space and traveling through it, but unlinked from the element that generated it and when this field reaches the target, it generates in it induced currents, which will produce in turn a magnetic field that will oppose the magnetic field that created it, producing a repulsion force between the space and the plate acting as target, this force multiplied by the time of magnetic pulse duration will give us an impulse that in turn tends to accelerate the plate, the plate is fixed to a structure that unites it with the emitter element, and being this structure of a not conductive material and magnetically transparent to the field, a small impulse will be obtained on the whole assembly, which will be repeated billions of times per second, thus integrating a considerable total impulse, the repetition of the pulses generated by de coils is controlled by an electronic circuit, the electronic control can also work as an UHF oscillator where the current signal that activates the coils, is part of a resonant circuit that makes it more efficient, but in the latter case, the frequency of the UHF oscillator, must be such, that its wavelength, is less than (L) divided by (C), being (C) the speed of light and (L) the distance between the emitter coil and the plate acting as target, this constitutes the passive magnetic version of the motor, in the active magnetic version of the motor, the plate acting as target, is replaced by a coil that acts synchronized with regard to the generating coil or an arrangement of generating coils, so that, once the magnetic pulse has been generated and that it has been unlinked from the transmitter coil, shortly before the magnetic pulse reaches this coil-target, this one will generate a field in opposition to the magnetic pulse that approaches it; this action can be complemented with another coil, placed on the same support structure but on the other side of the pulse transmitter and this other coil will produce a magnetic field in synchrony that produces an attraction with respect to the magnetic pulse that was generated, been that the magnetic pulse expands in both directions with respect to the generator element, using a Helmholtz coil arrangement, helps to concentrate he expansion lines forces in a more parallel way to the assembly structure, the use of two target coils or secondary coils, allows to take advantage of the same magnetic pulse to generate repulsion and attraction on the coils adding both forces of repulsion and attraction in a resulting acceleration of the assembly in the same direction.

Another modality of the same motor uses only electric field. An electric field generating plate produces electric field pulses of very short duration as in the magnetic version, but this one uses target plates or secondary plates to produce an action of attraction or repulsion with respect to a pulse of generated and unlinked electric field that is propagated in the space between the generating plate and the target plates or secondary plates, in this case, the field travels an disperse in a more focused and directional way.

The concept of unlinking the field, is the basis of the operation of this motor, and we could explain it more easily if we consider that we have an element capable of generating a very short field pulse and then this emitter disappears, we would have a field pulse traveling into space that can affect or interact with suitable devices, either a conductive plate or a coil or second field generator. The necessary electronic components and devices, to generate these ultra-high frequency fields, are now available as cold cathode tubes and high-power gallium nitride transistors.

DETAILED DESCRIPTION OF THE INVENTION

Figure 1:
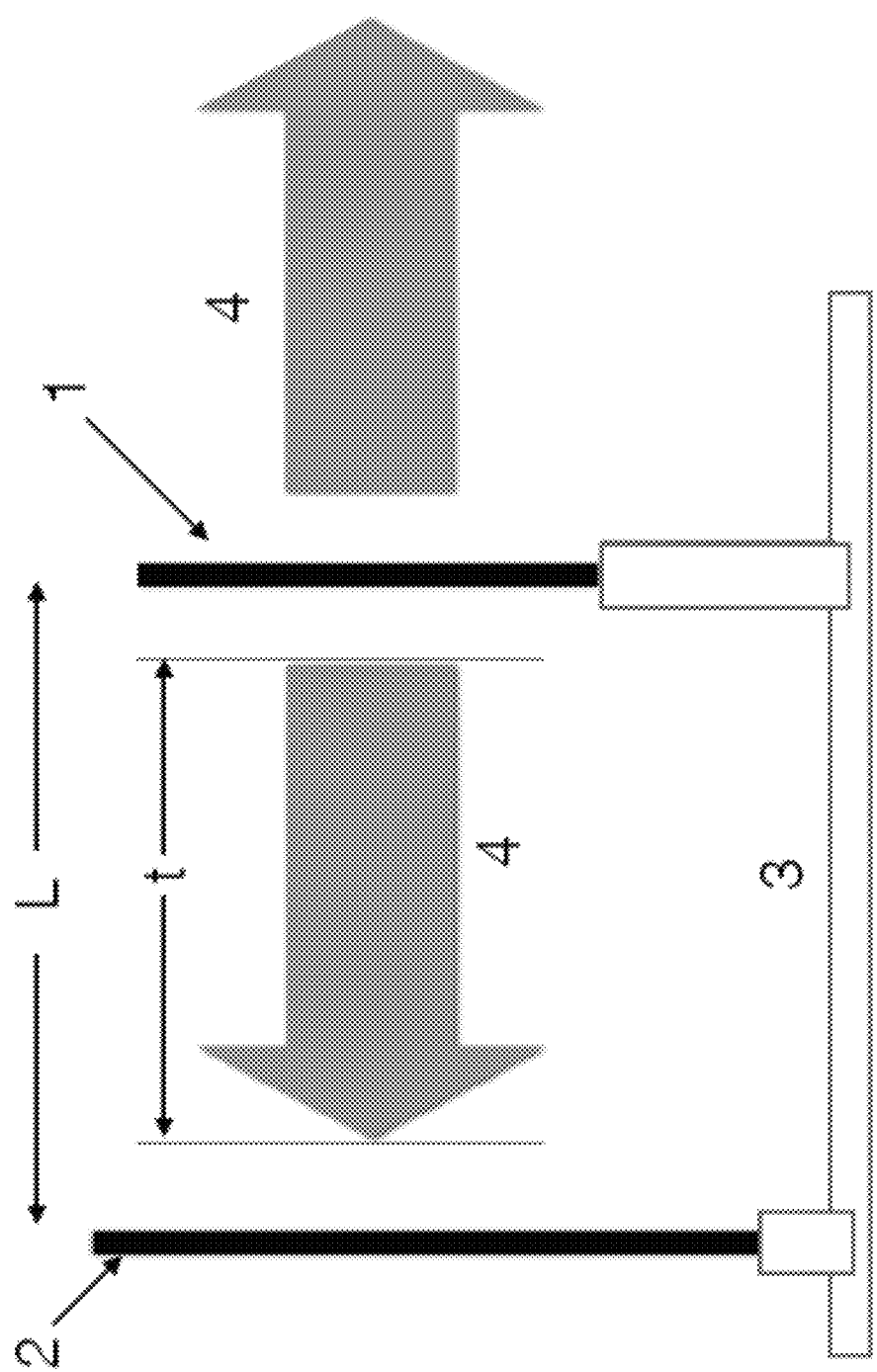
FIG. 1 shows the basic structure of the motor where a generator and a target element can be seen mounted on a structure that supports both and is also seen a field pulse that has been generated and that once unlinked from its emitter it travels toward the target.

The ultra-high frequency electromagnetic motor or thruster object of this invention, is based on the generation of pulsed electric or magnetic fields of extremely short duration (in the nanoseconds range) field pulses that are released into the surrounding space being unlinked from the source and the structure of the motor until these pulses, which we can consider fields of ultrashort duration and that move through space, reach what we call a target that is but an element capable of interacting with this pulsed field, generating a force from this interaction and being that the field initially generated is associated with the surrounding space but not to any other component of the motor or thruster, it can generate an impulse on the target but of very short duration, impulse which is transmitted to all the motor to which the target is attached as well as the emitter that gave origin to the pulsed field, this process is repeated billions of times per second to integrate a relevant total impulse on the target and therefore on the motor itself so that this total impulse will be the sum of all the partial impulses (F×dT) over a second, which is equal to integrate the value of (F×dT), being dT the differential of time that each pulse lasts, this allows that although the impulse of each cycle has an extremely short duration, if the intensity of the pulsed fields is very large, it is possible to obtain a useful final impulse, the distance between the emitter element of the field and the targets should preferably be in a range between 20 cm. and 120 cm, this distance to which we call (L), makes it easier to integrate all the electronic and power elements as it is made larger, but the force generated, has a relationship that is inverse-quadratic whit respect to distance, so it is best to reduce (L) as much as possible to where the electronics that control the emission of pulses allows it.

In summary, the operation of this motor or thruster, is based on generating extremely short and powerful electrical, magnetic or electromagnetic field pulses and unrooting or delinking these field pulses from the source that generate them, so that later another attached element to the support structure that holds both the emitter device and the device that we call target, remain for an instant disconnected from the field pulse and waiting for this pulse field to reach the target, at which point, this element, will emit a new pulsed field with a polarity such that generates a force of attraction or repulsion of the original pulse field with respect to the target and therefore to the motor or thruster of which they are part as a unit, both the emitter and the target joined by a support structure.

The proper synchronization of the emission of field pulses is controlled by a set of electronic circuits consisting of a power module, a control unit based on a microcontroller, power supplies, capacitor banks and overshoot suppression circuits; all these circuits are joined to constitute a pulse generator or continuous signal that works as such, working between the bands of UHF and SHF. Although at the moment we have only done tests with magnetic fields and frequencies in the lower part of the UHF band, we have been able to generate forces of a few grams, which may seem negligible but it is not if we consider that the motor can generate constant accelerations for long periods of time, which can be very useful for applications such as the maintenance of satellites in orbit and as we can increase the operation frequency of the motor, the forces obtained will be much greater.

Figure 2:
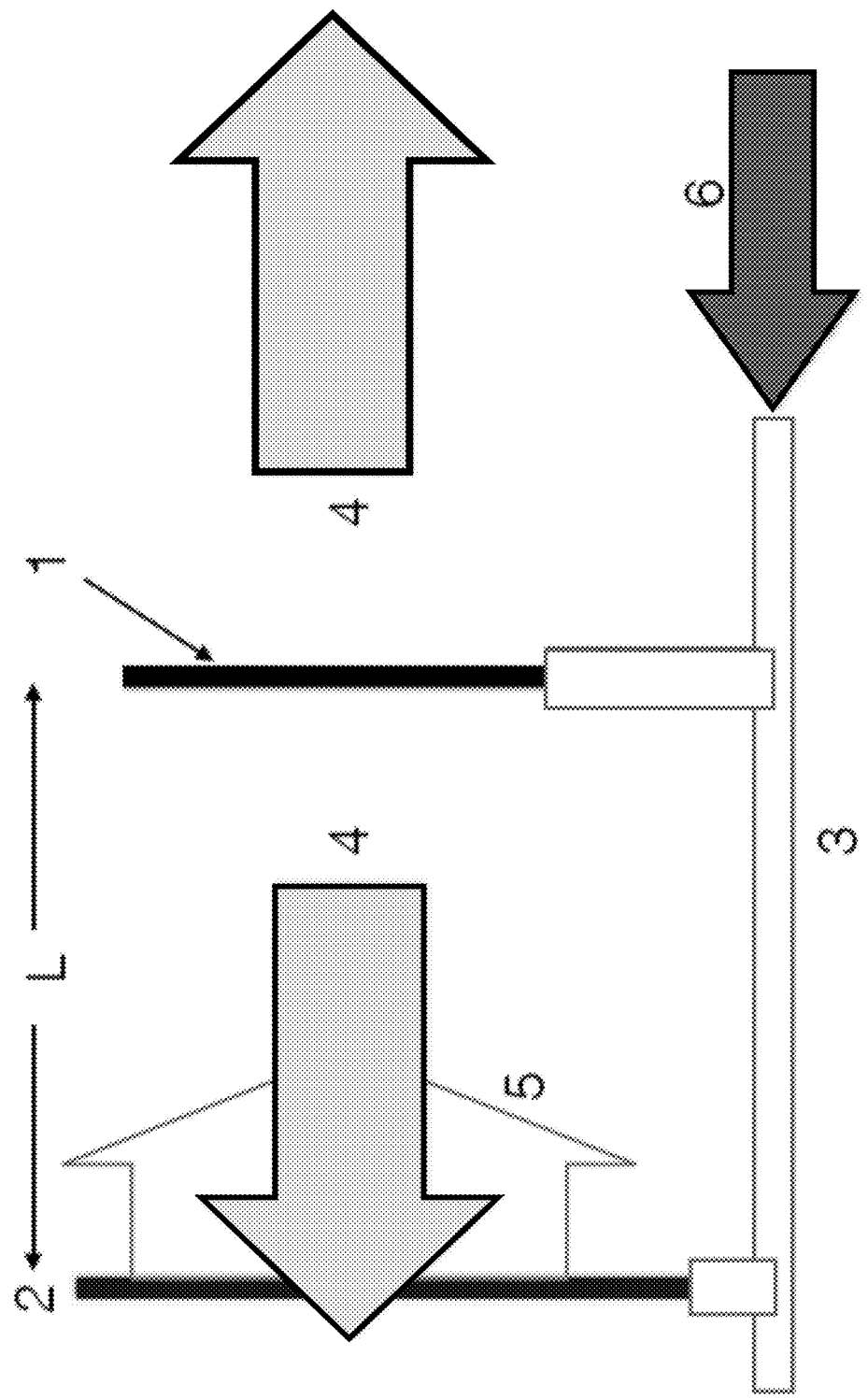
FIG. 2 shows how the field pulse when reaching the target, interacts with the field generated on arrival to target producing a resultant impulse on the support structure.
Figure 3:
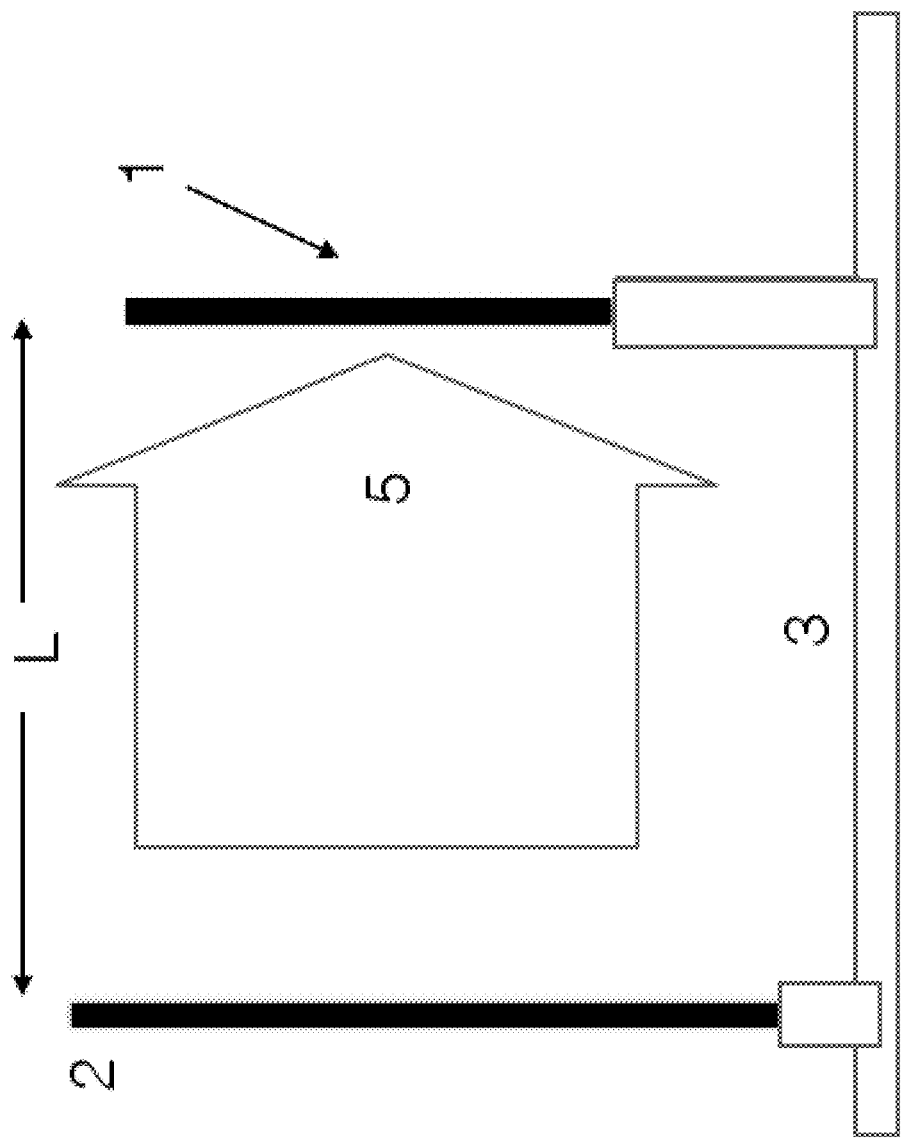
FIG. 3 shows the generated secondary field, which after interacting with the unlinked field pulse traveling in the space towards the target, now travels in the direction of the primary pulse generator, but no longer produces any interaction with it.

FIG. 1 shows a basic motor assembly, in this case a support structure (3) is shown, on which a primary magnetic field emitter (1) and emitter reflector (2) or secondary field emitter which constitutes the target are mounted, the pulsed field or field pulse (4) has been represented by means of arrows for simplicity and this generated field pulse (4) expands in both directions, in the case of FIG. 1, to the left and to the right, there is a distance (L) between the primary magnetic field emitter (1) and the emitter reflector (2); as an example of operation, let's assume that the primary magnetic field emitter (1) is a coil whorl and that the generated field pulse (4) has a duration (t) so that "t" is less than the distance (L) divided by (C), where (C) is the speed of light, which is field expansion speed; as shown in FIG. 1, for a moment the field will move and will be completely unlinked from its primary magnetic field emitter (1) and because the material the support structure (3) is made of is non-conductive and transparent to the field, the field pulse (4) will be associated only to the space and not to the elements that are part of the motor, until the field pulse (4) reaches the target which in this case is the emitter reflector (2), In this case the emitter reflector is a conductive material plate, when influencing this plate, the field pulse (4), will produce on the plate, induced currents, which in turn generate a magnetic field that opposes the field pulse (4), this reaction field or reactive field (5), as shown in FIG. 2, causes a resultant force (6) to occur in opposition to the field pulse (4) for a period of time (t), this will generate an impulse (F×t); this process is repeated billions of times per second in order to integrate a significant total impulse, formed by the sum of all the micro-impulses that are generated in each cycle, this operation is done taking into account the due synchronization in the generation of each pulse, so that there is no counter-productive interaction of the reactive field (5) that has now been generated and that has less intensity than the initial field pulse (4) however, part of this field will move in the direction of the primary magnetic field emitter (1) and other motor components, as shown in FIG. 3 and therefore it is necessary to prevent that the transit of this reactive field (5) generates unwanted reactions with the rest of the components or other elements that are part of the motor, for this the coil that constitutes the primary magnetic field emitter (1) will be momentarily disabled and without the possibility of electromagnetic interaction with the reactive field (5). In order to generate powerful enough field pulses, the electronic circuits are capable of handling high voltages on the field emitters, in this case a transmitter coil and frequencies in the range of the ultra-high frequency band high frequency and super high frequency (UHF, SHF).

Figure 4:
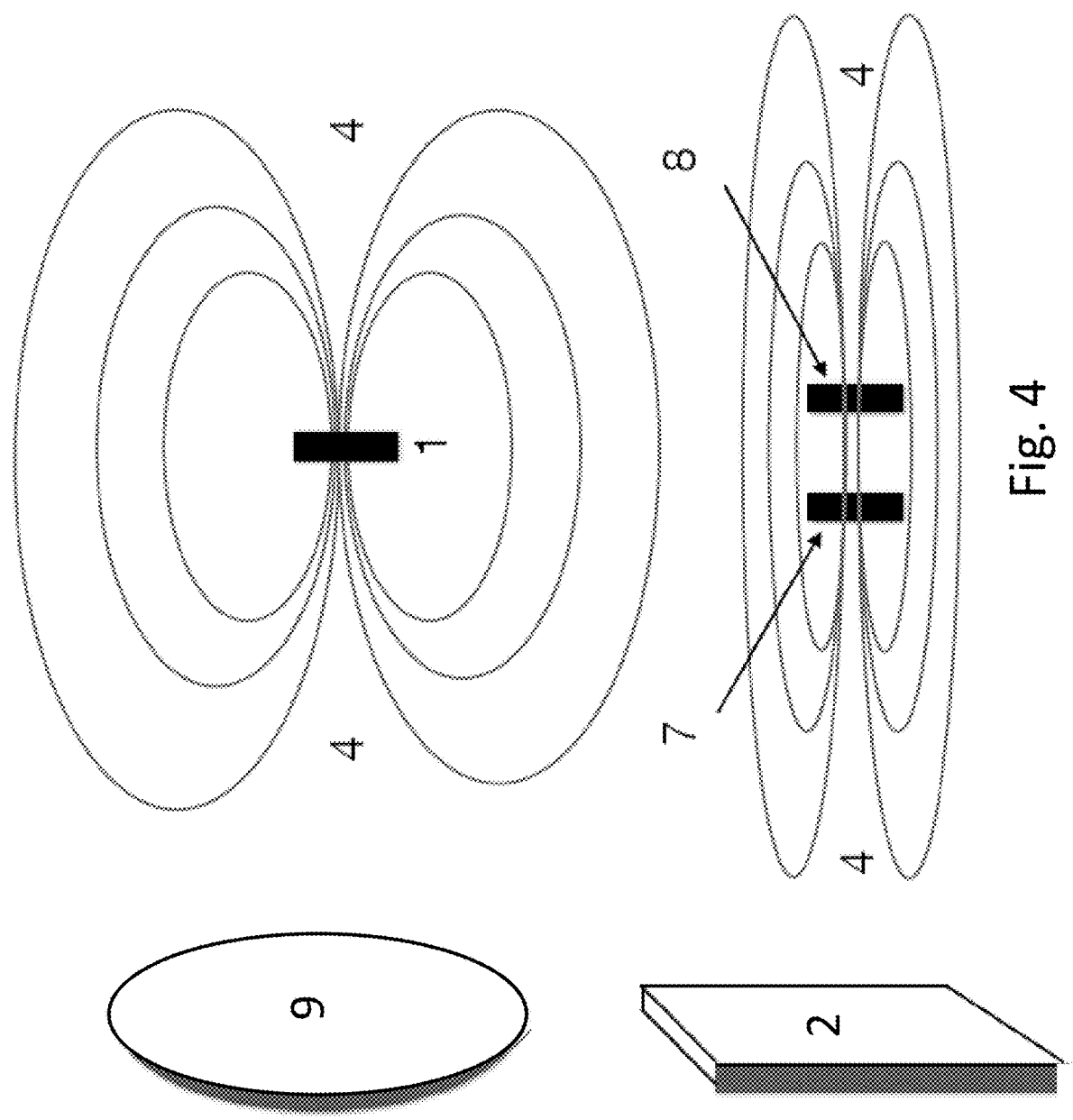
FIG. 4 illustrates how the use of a Helmholtz coil array, allows for the generation of more concentrated magnetic fields, increasing their interaction with target plates whether they are flat or concave.

To simplify we have represented the displacement of the fields by means of arrows, as we can see in FIG. 4 magnetic fields and field lines take a similar aspect to a toroid as can be seen in the upper part of FIG. 4 in which the primary magnetic field emitter (1) which is a simple coil generates a very dispersed field pulse (4) and to take full advantage of this type of field, a concave plate target (9) or reflector is used. the image shown at the bottom of FIG. 4 illustrates the use of two coils (7, 8) in an arrangement known as Helmholtz coil assembly, this arrangement makes it possible to align the field lines in a more colinear way with both coils (7, 8), which are placed at a distance between them equal to the radius of the coils, this facilitates the use of a flat emitter reflector (2) making motor performance more efficient. all the above description intends to exemplify the principle of the basic operation of this motor or thruster, but this can be built in various modalities that improve its efficiency and ease of construction, being able to work with both electric fields and with magnetic fields or even electromagnetic fields, but all with the same principle of operation and basic structure.

Figure 5:
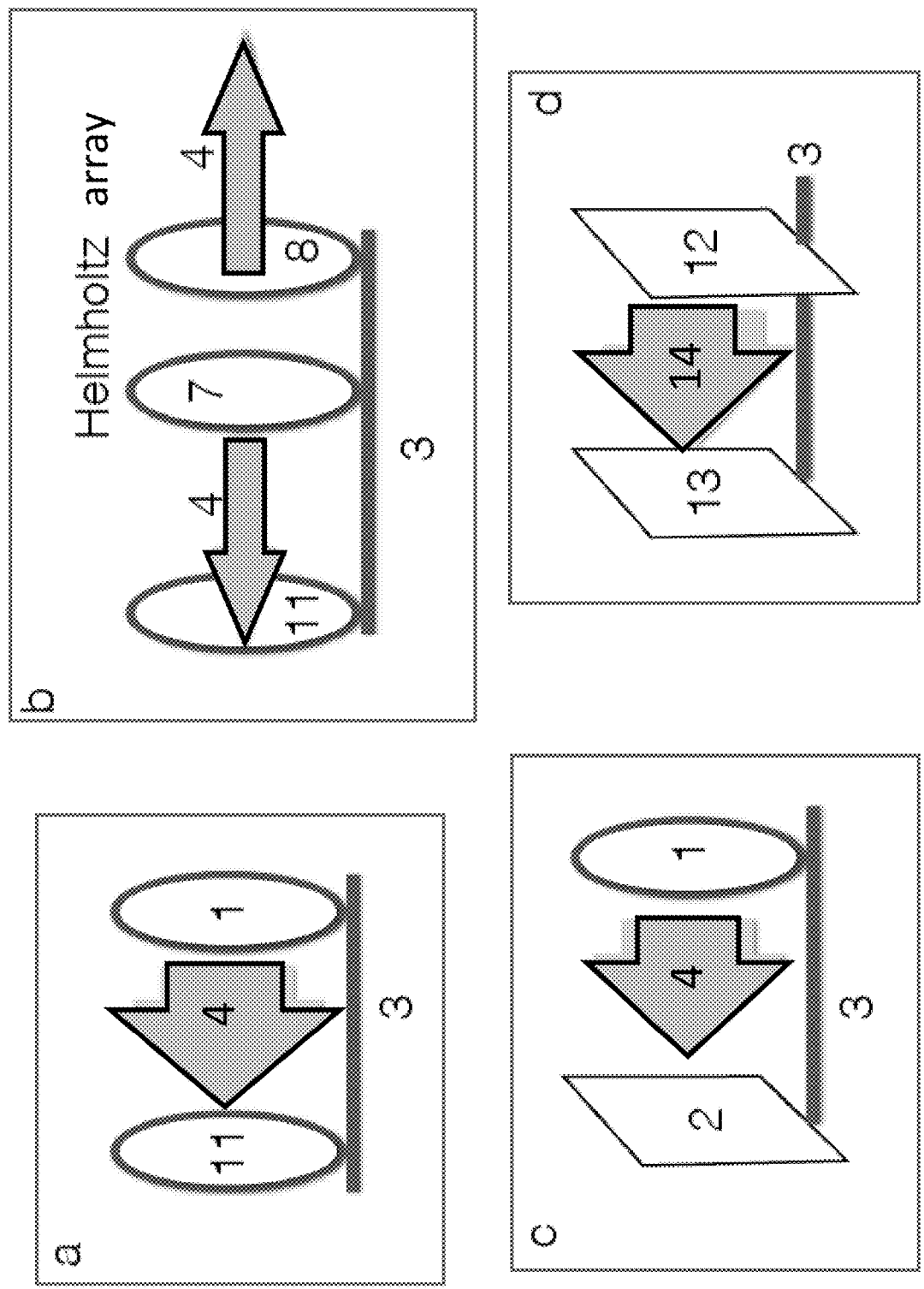
FIG. 5 shows four basic motor modalities, namely; passive magnetic, active magnetic, magnetic with Helmholtz array and electric.

In FIG. 5, 4 different modalities are shown, the box (c) basically corresponds to the model described above and we call it passive magnetic model, since it uses a primary magnetic field emitter (1) which in this case is a transmitter or magnetic field generating coil, to produce a magnetic field pulse (4), which when influencing the emitter reflector (2) which in this case is a conductive plate, generates an opposing field that translates into an impulse, this is the simplest assembly of the motor. The box (a), shows the primary magnetic field emitter (1) formed by a magnetic field pulse generating coil that generates a magnetic field pulse (4) and the target in this case is constituted by a secondary magnetic field emitter (11), which generates a magnetic field that opposes the field pulse (4), in this case, the latter is triggered by an electronic circuit that determines the precise moment in which the reactive field (5) must be generated, this assembly is more efficient and generates more force than in the case of the passive magnetic model assembly shown in box (c), we call it active magnetic model.

The box (b) shows an active magnetic assembly, but using as a field emitter a Helmholtz arrangement formed by the coils (7,8), this produces a field pulse (4) more aligned to the central axis that passes through the coils (7,8) and the secondary magnetic field emitter (11), allowing for better use of the generated magnetic field pulse (4). The box (d) shows a completely electric motor assembly, in which a primary electric field emitter (12) is used, which produces an electric field pulse (14), which will interact with a secondary electric field emitter (13), similar to how the assemblies based on of magnetic fields act, for simplicity the electric field pulse (14) has been represented as an arrow pointing towards the secondary electric field emitter (13), although the field actually expands in that direction and in the opposite direction simultaneously, as it is a plate, these emitters generate electric fields with field lines essentially perpendicular to the plane of the plates, so you can take advantage of most of the energy contained in the generated field pulses, we call this, the basic electrical model and is more efficient than the magnetic models but require the handling of very high voltage electric pulses.

The architecture of this system is not limited to using either a magnetic assembly or an electrical assembly, it is also possible to unify both models by the generation of an electromagnetic field emitted by an antenna, which interacts with a target placed both on a common structure as in the cases described above, in this option, the design of the antenna, in order to use most of the emitted radiation, must handle the length of the main antenna and the placement of multiple antennas at distances that are fractions of the wavelength of the emitted signal to give the emission directionality and concentration towards the target.

Figure 6:
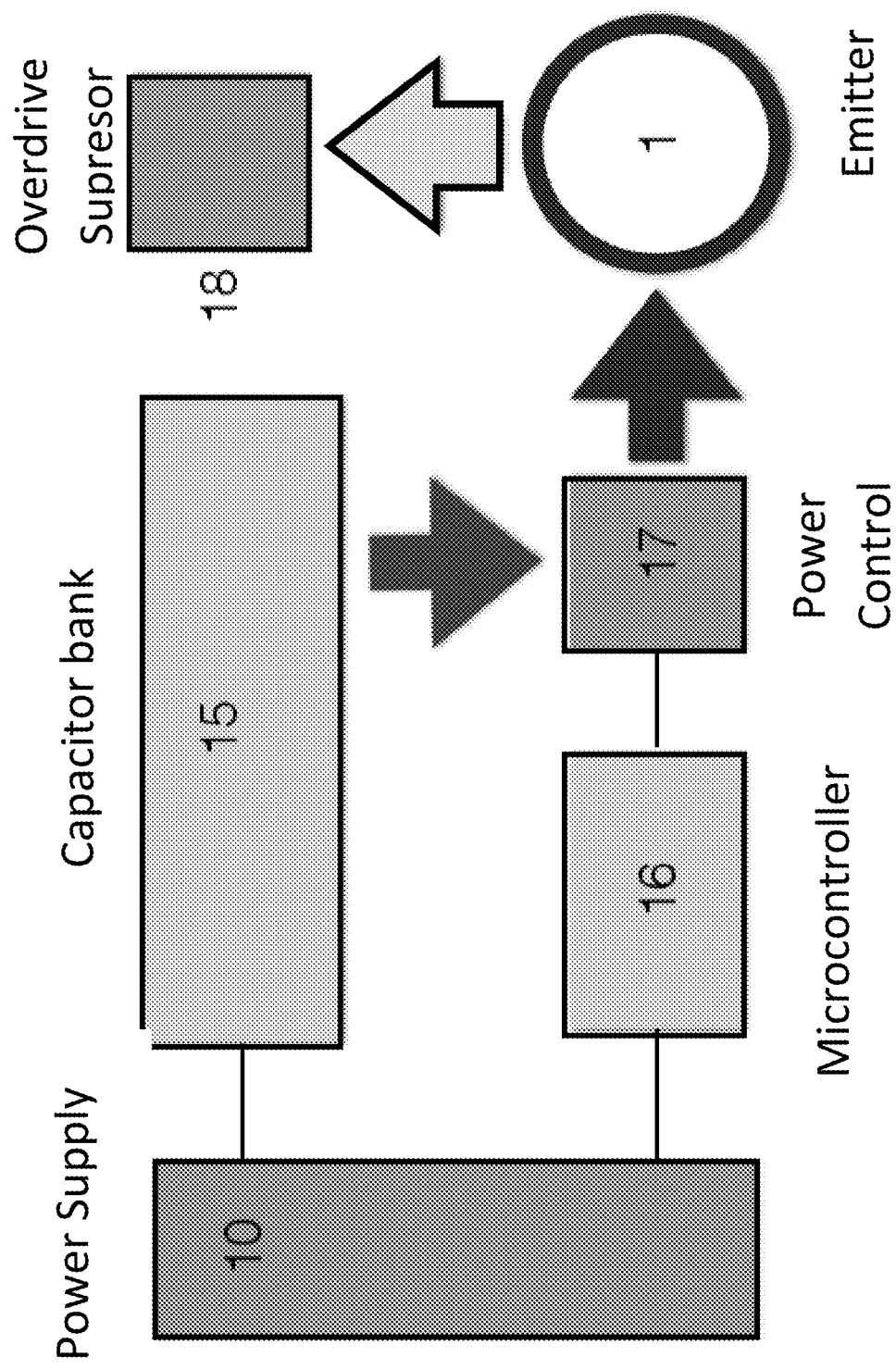
FIG. 6 shows a block diagram for the emission of high-power, high-frequency magnetic field pulses.
Figure 10:
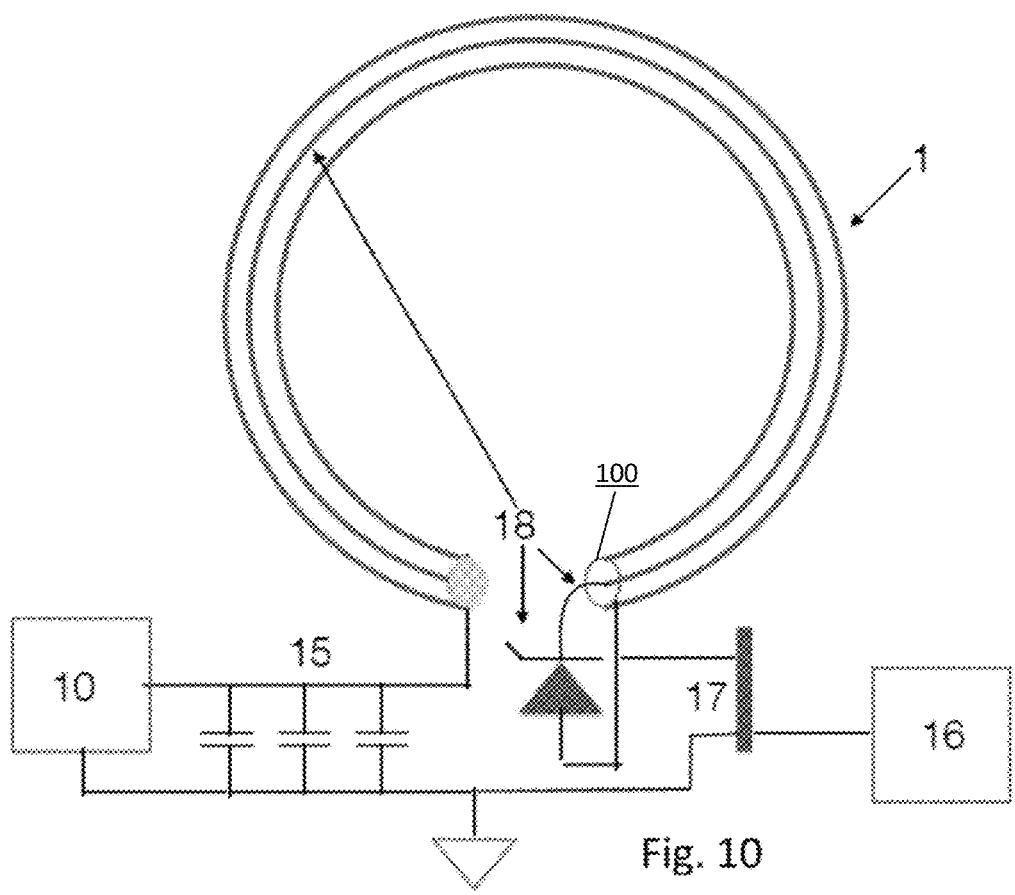
FIG. 10 shows a magnetic pulse-generating coil and part of the circuits required for its operation.

The basic architecture of the circuits that control the excitation of the field emitters that are part of this motor, have basically two modes of operation, the first one consists of a circuit that generates large pulses of current or voltage depending on the nature of the emitter and as shown in FIG. 6 it consists of a power supply (10), in charge of elevating and controlling the voltage at the required levels, a capacitor bank (15) that allows to have enough current and voltage instantaneously, a microcontroller (16) that is basically responsible for coordinating and synchronizing all the motor operations, that is, when each pulse should be emitted and in which synchrony; the firing orders are communicated by this microcontroller (16) to a power control (17) responsible for the administration of the necessary energy to the field emitters; an overshoot suppressor (18), makes it possible that when the microcontroller (16) commands that the pulse emission should terminate, the inertia of the system does not continue to send energy to the emitter, but the surplus of energy that is generated must be diverted so that it does not continue feeding the emitter and can even help suppress the pulse emission, the latter can be seen in FIG. 10 where in this case the primary magnetic field emitter (1), is a single loop tubular coil formed by a hollow tube (100), inside which is a conductor that together with an ultrafast diode, form the overshoot suppressor (18), this works on the basis that once the microcontroller (16) commands the power control (17) to cut the pulse that is issuing, the current flowing through the primary magnetic field emitter (1), presents an inertial effect and will try to keep flowing through it, however when the power control (17) finishes de pulse, the current that previously flowed in the outside of the coil will now cause the diode to be directly polarized, and this current remnant now will flow through the cable placed inside the tubular coil but in the opposite direction, helping to abruptly brake the emission of magnetic field pulse. The fact that the coil is hollow, serves a dual purpose, helping to suppress the overshoots and also help the optimal performance at very high frequencies, since every solid conductor, when used to drive very high frequency current, the conduction is carried out more and more towards the surface or the external area of the conductor, until becoming equivalent to having a tube, since the nucleus or the center of the conductor is never used, this commonly called skin effect, appears especially in UHF applications the tubular shape of the coil, can also be used to flow through the inside of this, a cooling liquid, as the currents that are handled can reach several hundred amperes The second modality of the architecture of the electronic circuits that control the motor, is based on using a frequency signal, preferably generated by a resonant circuit that forms an oscillator that operates between the bands of UHF and SHF, this oscillator is a very high power oscillator and because it handles high voltage and current levels, when operating at frequencies so high, in the order of gigahertz, for practical purposes, we can consider, that each crest or valley generated by this oscillator, is a pulse, by adjusting the wavelength of this signal with the magnitude (L) which is the distance between the primary magnetic field emitter (1) and the targets, a much more powerful and devoid of overshooting system is achieved.

Figure 7:
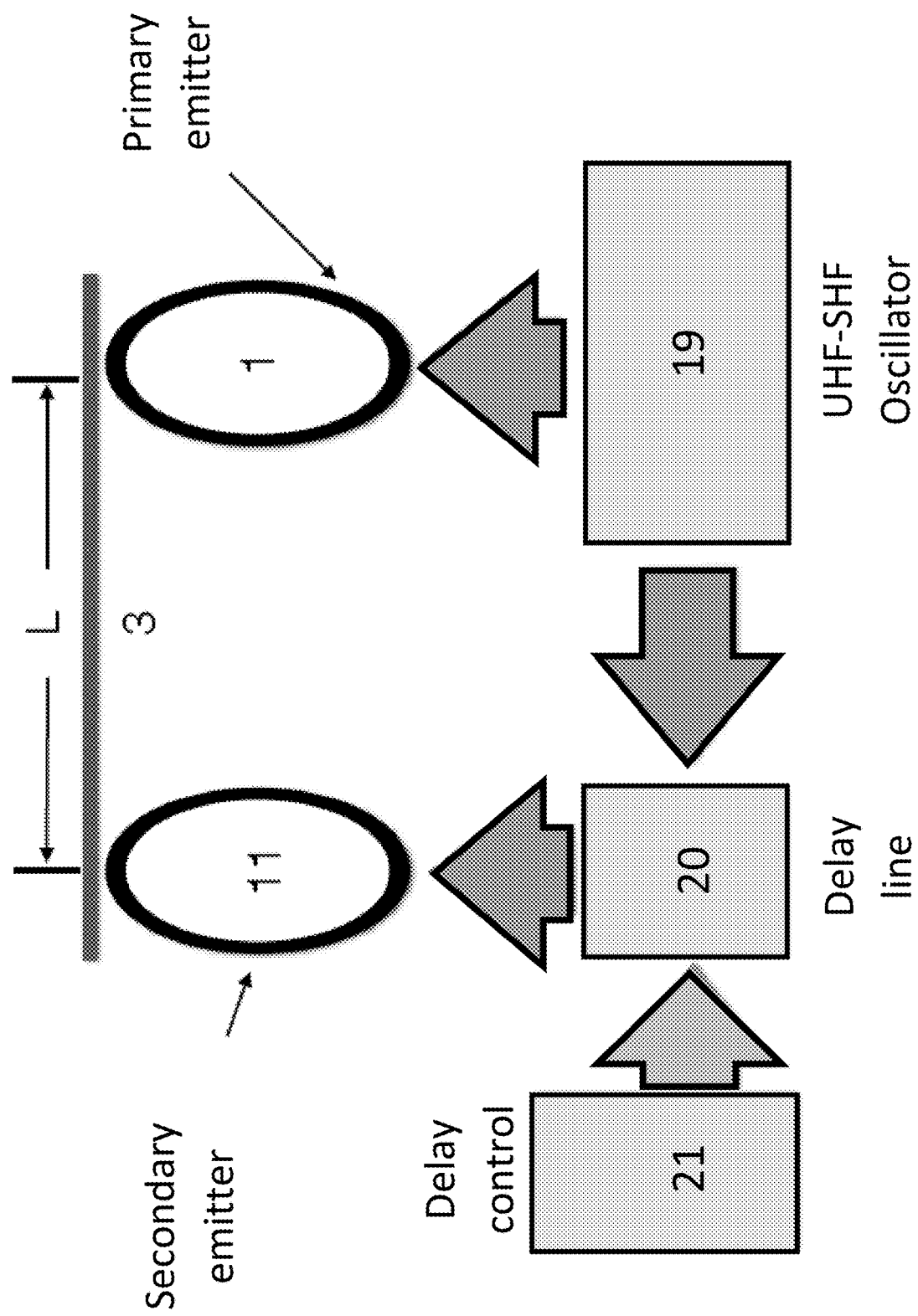
FIG. 7 shows a block diagram for operating the motor in magnetic-active mode, using a UHF-SHF oscillator and a controlled delay line to synchronize both emitter coils.

In FIG. 7, a block diagram of this arrangement is shown, where a UHF-SHF oscillator (19) feeds a primary magnetic field emitter (1) which is placed at a distance (L) from a secondary magnetic field emitter (11), which is indirectly fed by the same UHF-SHF oscillator (19), but its phase is adjusted by a delay line (20), self-adjusting by the delay control (21).

Figure 8:
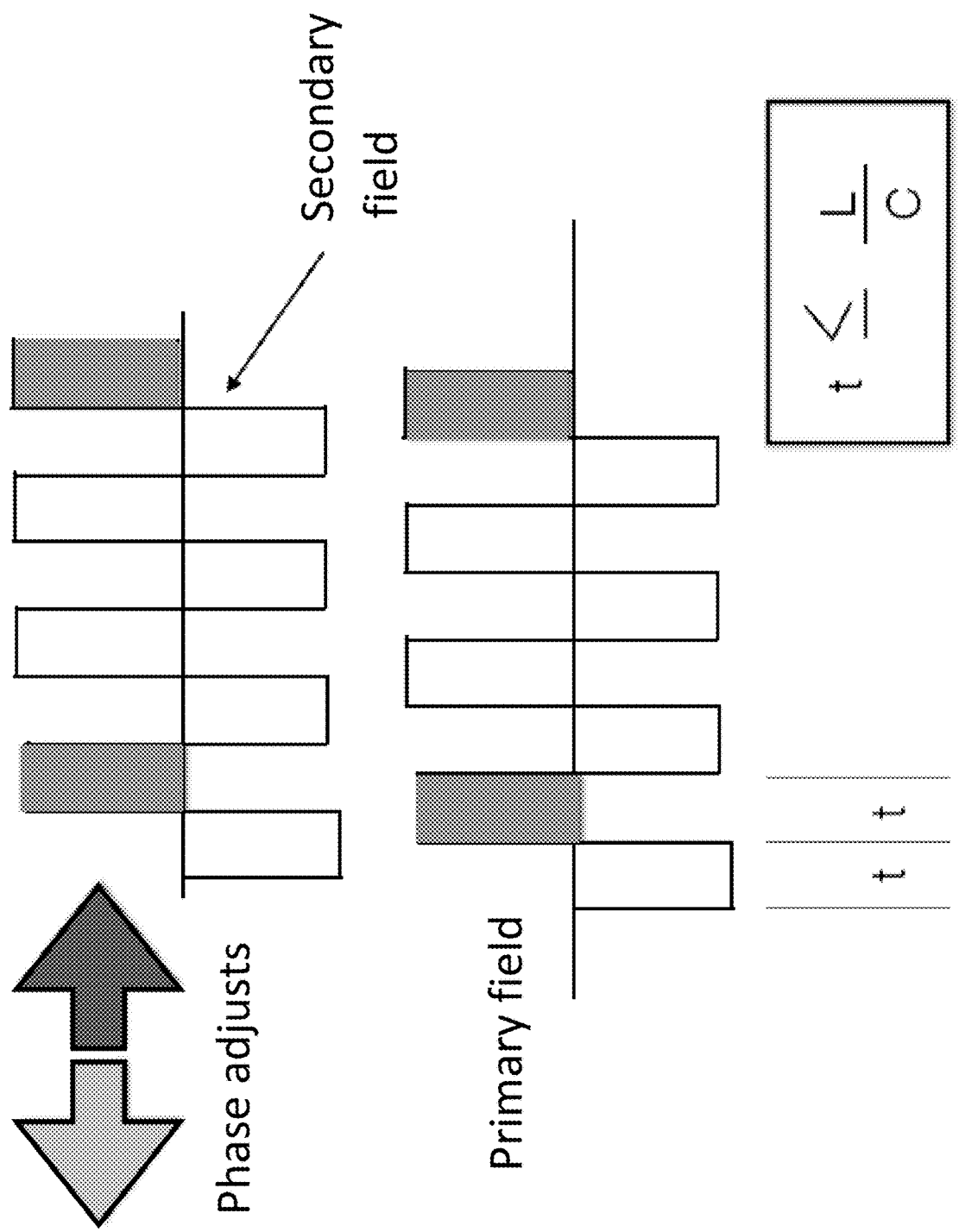
FIG. 8 shows how the phase setting operates to synchronize primary and secondary fields.

In FIG. 8, it is possible to observe the feeding current of the primary field and the secondary field, generated by the primary magnetic field emitter (1) and the secondary magnetic field emitter (11), and it can be seen that the phase adjustment allows to control the excitation of each one of the coils (shaded area) in such a way that the electronics makes the necessary adjustments so that the time (t), equivalent to half period, is less than or equal to (L) the distance between the two emitters, divided by (C) which is the speed of light and the same propagation speed of the field.

Figure 9:
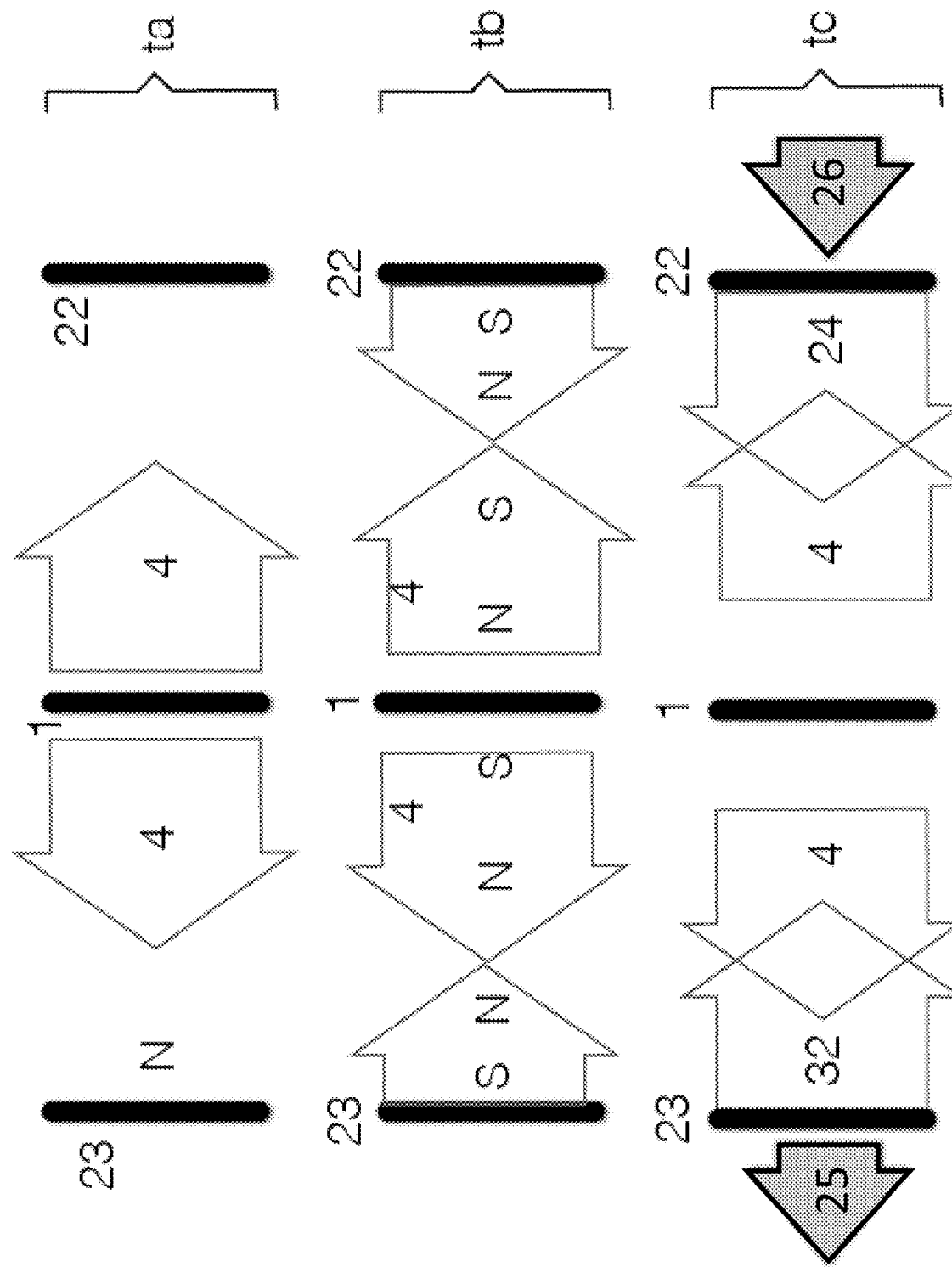
FIG. 9 shows a three-coil motor, one primary generator and two secondary generators in three different times of a cycle of operation.

FIG. 9 shows the most efficient arrangement for the magnetic impulse motor, this arrangement consists of three magnetic field generating coils placed on the same support structure (3), which is not shown in this figure by questions of clarity; in this arrangement, the central coil, is the primary magnetic field emitter (1) and has a primary reactive coil (23) and a secondary reactive coil (22), these three coils, are fed by an electronic circuit with either of the two architectures previously mentioned, pulse or continuous oscillator, it simply add an extra power control (17) for the third coil and an additional delay control for the same coil, FIG. 9 also shows three different stages of the motor operation cycle, in period (ta) the primary magnetic field emitter (1) has generated a field pulse (4) that is already freely and without being rooted or linked to its primary emitter moves through the space between the primary magnetic field emitter (1) and the primary and secondary reactive coils (23, 22), placed at a distance (L) between each of them and the primary magnetic field emitter (1), at that moment, the field pulse moves through space and has no roots whatsoever with any element of the motor, this field, presents a north polarity to the left and south polarity to the right, as can be seen in the image corresponding to the period (tb), when the field pulse (4) is close enough to both reactive coils, they will begin to generate a polarity field pulse as shown in the picture corresponding to the period (tb), causing a repulsion of the primary reactive coil (23) to the left when fields of equal polarity face to face are found, whereas in the secondary reactive coil (22), a force of attraction of this coil with respect to the field pulse (4) will be presented that now belongs to the space, which determines as a result a total impulse to the left of the three coils and the supporting structure that holds them. In the period (tc), we see the total interaction of the field pulse (4) with the primary reactive field (32) and the secondary reactive field (24), this generates the resulting repellent force (25) to the field pulse (4) and the resulting attractant force (26) to the field pulse (4).

Figure 11:
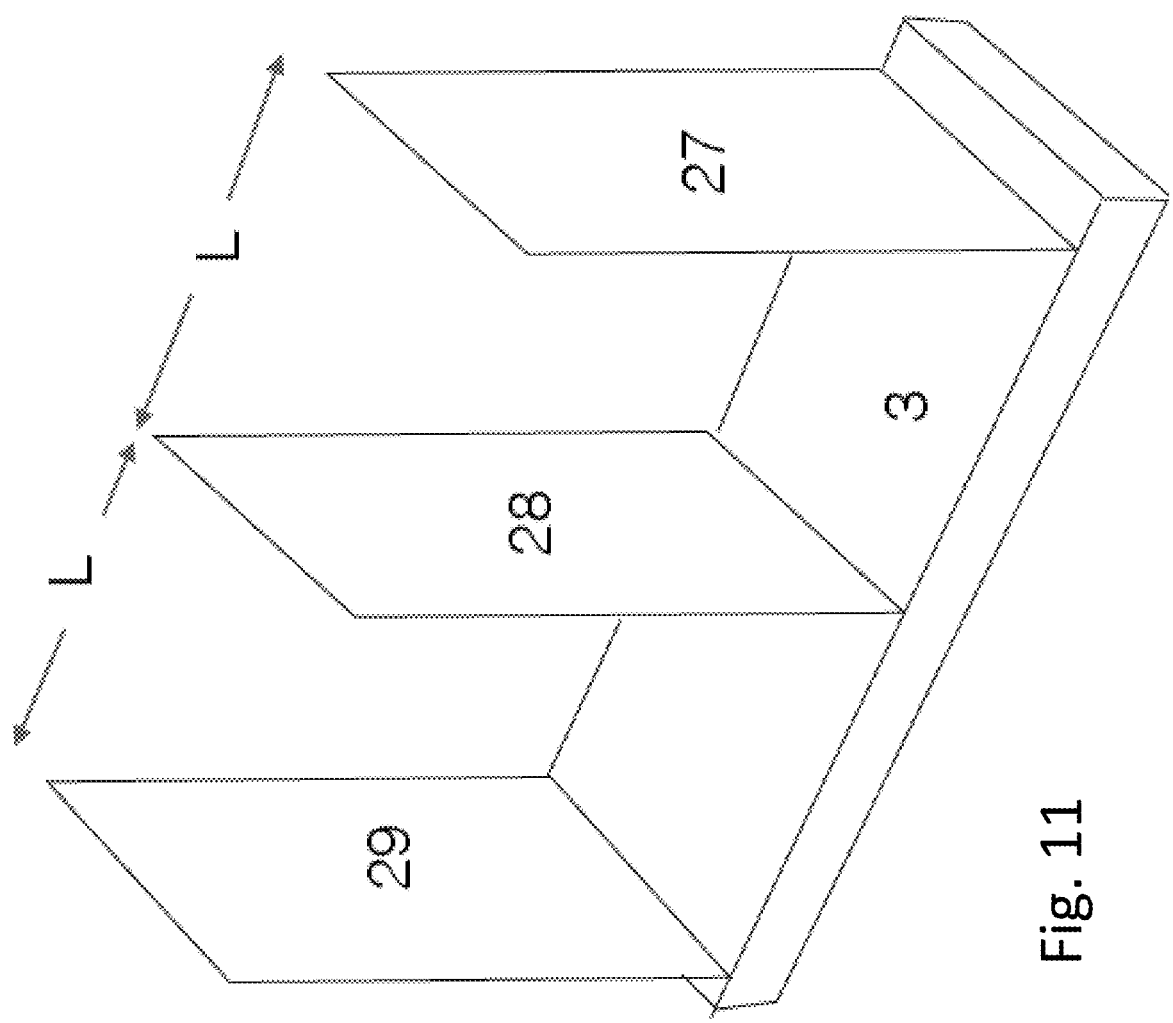
FIG. 11 shows the basic structure of a three-plate electric field motor, a primary generation plate and two secondary plates.

FIG. 11 shows the basic structure of the purely electric motor, in this case, on the support structure (3), three plates are placed, the emitter plate (28), the primary reactive plate (29) and the secondary reactive plate (27), these plates can be implanted using electronic control circuits and power a high voltage so that the charge stored on these plates, whether positive or negative serve as elements for generating electrical fields with their respective polarities, it is important to note that unlike the generation of magnetic fields, the electric fields originated in a charged plate, have field lines or propagation lines perpendicular to the plane of the board and they expand with the same polarity towards one or the other side of the plates, we will continue considering (L) the distance between each plate, the same as in the case of the solution by magnetic fields.

Figure 12:
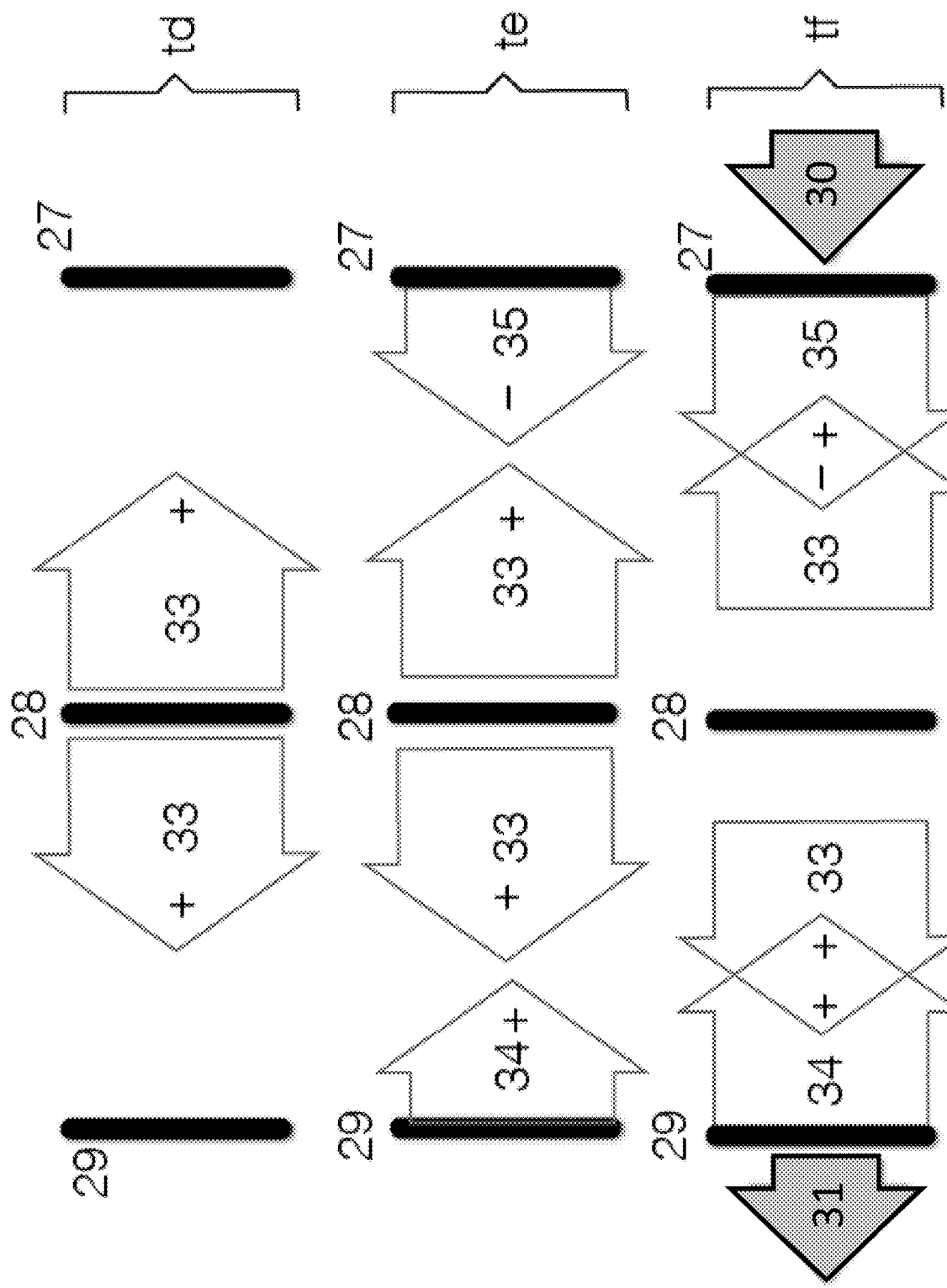
FIG. 12 shows the operation of an electric field motor or thruster at three different stages of a cycle of operation.

FIG. 12 shows the process of a working cycle with an electric field-based operation motor only. In the section marked as period (td), the emitter plate (28) is used to generate an initial electric field pulse (33) that moves perpendicularly to both sides of the emitter plate (28), the duration of this pulse is less than or equal to the distance (L) that separates each plate, divided by (C) which is the speed of light, the initial electric field pulse (33), is unlinked from its emitter plate (28) as it travels to the other plates, primary reactive plate (29) and secondary reactive plate (27), once the initial electric field pulse (33) approaches the reactive plates (27,29), these emit two electric field pulses (34,35), as shown in FIG. 12, the initial electric field pulse (33), will find a field of equal polarity, the primary electric field pulse (34) on the left side, producing a repulsion between the initial electric field pulse (33) which is now associated only with space, and the primary electric field pulse (34), which is being generated by the primary reactive plate (29) as it can be seen in the period (te), while on the right side of the figure, you can see that the initial electrical field pulse (33), will found with a secondary electric field pulse (35) generated by the secondary reactive plate (27), which produces an attraction effect between the initial electric field pulse (33) and the secondary reactive plate (27), as seen in the period (tf) corresponding to the bottom line of FIG. 12, this interaction of fields, generates a repulsion force of the primary reactive plate (29) with respect to the initial electric field (33) and an attraction force of the secondary reactive plate (27) with respect to the initial electric field (33), and given that the Initial electric field (33) is completely unlinked from the emitters, support structure and others components of the motor, the impulse is generated from the space towards the reactive plates (27,29) generating a final impulse in the same direction, in this case, to the left, being the attractant and repellent forces (31 and 30) the forces that are added to give a resultant impulse in the same direction, being these forces the result of an attractant force (30) and repellent force (31) of the surrounding space associated with the initial electric field (33).

As could be seen throughout the description, this motor or thruster, requires no more than electric power to operate, and can do it perfectly in the vacuum or outer space, the electric power can be obtained from solar cells, atomic batteries, etc. and it doesn't requires any fluid for operation, can operate indefinitely as long as it has any kind or energy source transformable into electric power.

Figure 13:
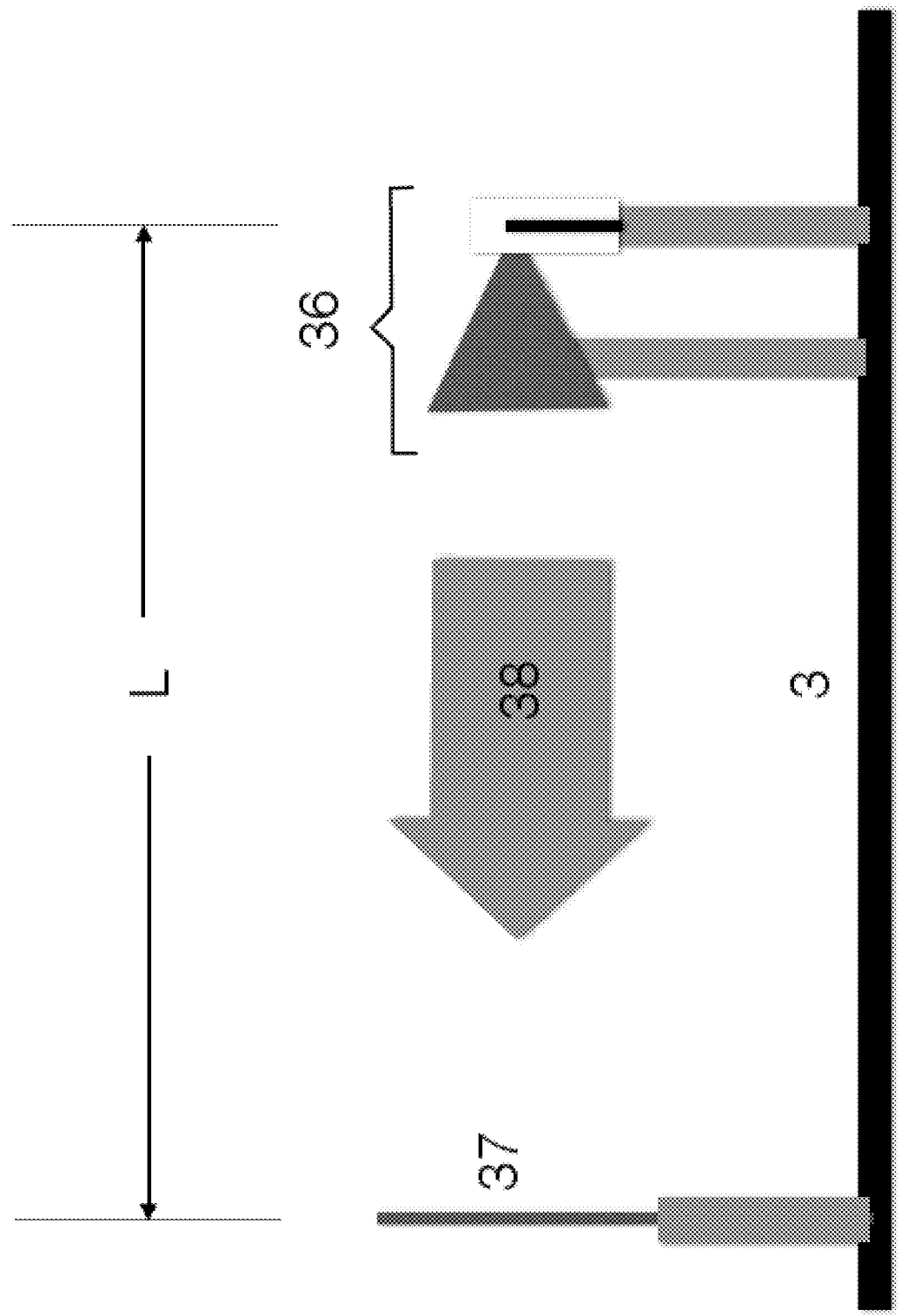
FIG. 13 shows a version of the motor using electromagnetic waves, the emitter is replaced by an array of emitter and antenna and a plate or a resonant circuit is used as a target.

FIG. 13 shows the same concept of the motor, but using electromagnetic pulses generated by an emitter and microwave antenna array (36) that produces electromagnetic pulses (38), having as a target a conductive plate (37) that at any given time can be replaced by a resonant circuit or other emitter and microwave antenna array (36), placed at a distance (L) from the first arrangement and pointing in the opposite direction, or towards the first antenna emitter arrangement, with these transmitters with their corresponding antennas controlled by the same power control and synchronization circuits.

What is claimed is:

1. An ultra-high-frequency electromagnetic motor or thruster comprising:
   a primary field pulse emitter;
   a first target located at a distance (L) with respect to the primary field pulse emitter;
   a support structure on which the primary field pulse emitter and the first target are firmly installed and sharing the same support structure;
   an electronic power management circuit;
   a power controller;
   a control circuit; and
   an overshoot control circuit, wherein:
   the primary field pulse emitter produces pulses with duration (t), wherein the value of t is less than, or equal to the distance (L) divided by (C), wherein (C) is the speed of light allowing the pulse to unlink from its source and with a repeating frequency within the ultra-high-frequency of the primary field pulse emitter.

2. The ultra-high frequency electromagnetic motor or thruster according to claim 1, wherein:
   the primary field pulse emitter is a first hollow circular coil with a tubular construction, wherein:
      a conductor is disposed inside the tubular construction traversing along a length of the tubular construction while being isolated in such a way that the conductor does not make contact with the interior sides of the tube except at one end, wherein the conductor is connected to a surge suppressor that is connected to the power controller;
   wherein the power controller is controlled by a microcontroller that establishes the duration and synchrony of the pulses that are generated by discharging the energy stored in a bank of capacitors,
   wherein the capacitors are recharged by a power supply,
   wherein discharges that are produced on the surface of the coil generate the high-power and minimum-duration magnetic pulse
   wherein:
      the first target is a plate of conductive material mounted firmly on the same support structure holding the primary field pulse emitter.

3. The Ultra high frequency electromagnetic motor or thruster according to claim 1 comprising:
   an electronic power circuit; and
   a microcontroller, wherein:
      the first target consists a second coil connected to the electronic power circuit configured to emit pulses, wherein the emission of pulses, is synchronized and controlled by the microcontroller in such a way that it the first target emits a magnetic pulse after the primary field pulse emitter has generated a first field pulse or primary field pulse,
      the first field pulse is of a short duration t and is unlinked from the primary field pulse emitter element when heading towards the first target;
      the pulse generated by the second coil of the first target interacts with the first field pulse, generated in first instance by the primary field pulse emitter; and
      the interaction produces a force of attraction or repulsion relative to the field that travels in the intermediate space between the first target and the primary field pulse emitter, wherein this force when applied during the time (t), generates a micro impulse, wherein:
         repeating this process billions of times per seconder integrates after one second the total impulse exerted by the pulses of field on the target coil and the support structure.

4. The Ultra high frequency electromagnetic motor or thruster according to claim 1, comprising:
   a second target consisting of a third coil, wherein:
      the third coil is placed at the other end of the support structure with the primary field pulse emitter in the center;
      the primary field emitter is at an equidistant distance (L) of each of the two targets; and
      the three coils are placed along the support structure longitudinally;
      the third coil of the second target is controlled in th same way as the second coil of the first target and the third coil is fed inversely with respect to the second coil, wherein:
         one target coil generates a field that produces an attraction force; and
         the other one generates a field that produces a repulsion force with respect to the primary field pulse of the primary field pulse emitter.

5. The Ultra high frequency electromagnetic motor or thruster according to claim 1 wherein:
   the primary field pulse emitter comprises of two coils in a Helmholtz arrangement, wherein the two coils compress the force lines of the field pulses issued.

6. The ultra-high frequency electromagnetic motor or thruster according with claim 1, wherein:
   the primary field pulse emitter and the first target are conductive plates or boards connected to power control circuits with a corresponding microcontroller, wherein:
      the corresponding microcontroller is responsible for controlling and synchronizing the action of the power control circuits;
      the power control circuits provide the plates with high voltage pulses configured to charge the plates with different polarities when the primary field emitter emits electric field pulses; and
      the electric field pulses propagate or expand perpendicular to the plane of the target plate in both directions perpendicular to the conductive plates, wherein the electric field pulse of such short duration is unlinked from the plate that generated it and the pulse moves through the intermediate space between the two plates so that the second plate is synchronized to charge with a second voltage pulse, wherein:
         the second voltage pulse generates a second electric field; and depending on the polarity of the second electric field, a force of attraction or repulsion is generated when interacting with the primary electric field, wherein the force is acting during the time (t) that lasts the duration of primary electric pulse, this constitutes a micro impulse, wherein:
by repeating this process billions of times per second, will be integrated into final total impulse equal to the sum of all the micro-pulses generated every second.

7. The Ultra high frequency electromagnetic motor or thruster according to claim 6 comprising:
a second target, wherein the second target comprises a third plate placed at the other end of the support structure leaving the primary field pulse emitter in the center,
wherein the primary field pulse emitter is at an equidistant distance (L) of each of the two targets, placing the three plates along the support structure longitudinally, wherein:
the third plate; is charged and controlled in the same way as the first target plate; and
the third plate is charged inversely with respect to the first target plate, wherein:
the first target generates a field that produces a force of attraction; and
the second target generates a field that produces a repulsion force.

8. The Ultra high frequency electromagnetic motor or thruster according to claim 1 wherein_the electronic power management and the control circuit comprises:
a high power oscillator, wherein the high power oscillator operates within the bands of UHF and SHF which feeds directly the primary emitter target; and
a delay line controlled by a delay control circuit allows phase shifts to feed targets or secondary emitters, wherein:
the oscillator circuit is a synchronized resonant oscillator circuit with the ability to provide high voltage or high current peaks or pulses as required by the emitters.

9. The Ultra high frequency electromagnetic motor or thruster according to claim 1, wherein:
the primary field pulse emitter is a set of microwave emitters with a directional antenna placed at the distance (L) from the target;
the target comprises of a plate of conductive material, wherein the plate can be replaced by another assembly of microwave-emitter-antenna placed at the distance (L) from the first emitter assembly, wherein:
the microwave-emitter-antenna is directed towards the first emitter assembly,
wherein the pulses that are generated, are microwave electromagnetic pulses, wherein each microwave emitter is controlled by:
the control circuit based on the microcontroller;
the power management circuit and
the general power supply.

10. The ultra-high frequency electromagnetic motor or thruster according to claim 1, wherein the first target comprises a plate of conductive material mounted firmly on the same support structure holding the primary field pulse emitter.

11. The ultra-high frequency electromagnetic motor or thruster according to claim 1, wherein a power control element consists of an ultrafast interrupting device such as an ultra-high-speed transistors or a cold cathode tubes as switches.

* * * * *